Patented July 3, 1945

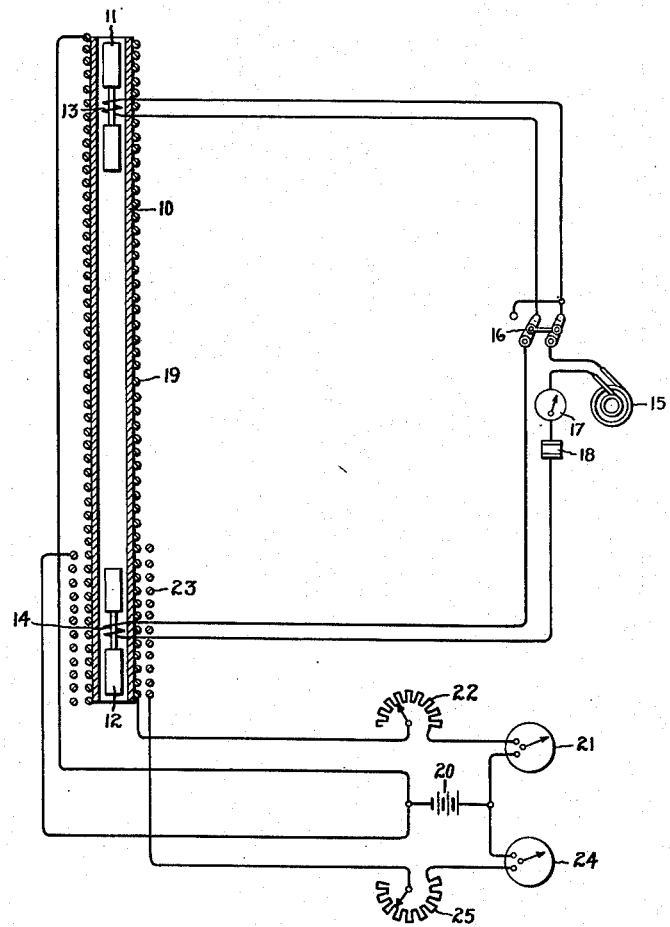
Inventor:
Albert W. Hull,
by Harry E. Dunham
His Attorney.

2,379,716

UNITED STATES PATENT OFFICE 2,379,716

MAGNETIC FIELD GRADIENT METER

Albert W. Hull, Schenectady, N. Y., assignor to General Electric Company, a corporation of New York Application September 16, 1943, Serial No. 502,625

4 Claims. (Cl. 175—183)

My invention relates to apparatus responsive to the gradient of a unidirectional magnetic field, or the difference in field strength at different points along a given axis.

The features of my invention which are believed to be novel and patentable will be pointed out in the claims appended hereto. For a better understanding of my invention, reference is made in the following description to the accompanying drawing illustrating a preferred embodiment of my invention.

In the drawing, 10 represents an elongated supporting structure which conveniently may be a tube of some nonconducting, nonmagnetic material. Supported thereby at spaced points is a pair of inductors 11 and 12. The distance between the inductors 11 and 12 may be from one to twelve feet, for example. The inductors are made of high permeability material, such as mu metal, and are of dumbbell shape or have a reduced central section capable of being readily saturated by a low value of flux. The reduced central sections may comprise a strip one-quarter inch wide by twenty mils in thickness. These inductors have their longitudinal flux axes parallel and in line with the flux to be investigated, and serve to pick up flux from the field, the gradient of which is to be determined and are used, as will be described, to measure the difference, if any, in field strength between the two points where such inductors are located. It is not essential that the flux axes of the two inductors be in line with each other, although that is the arrangement shown and is thus adapted to measure flux gradients along the direction of the flux path.

Around these saturable strips at 11 and 12 are coils 13 and 14, each of a large number of turns, for example, 5000. The two coils may be connected in series to a source of alternating current 15 and the circuit includes a reversing switch 16 to one of the coils and a sensitive direct current indicating instrument 17. Increased sensitivity is obtained if a nonlinear resistor of a material, such as described in United States Patent 1,822,742, is also included in the circuit, and at 18, I have represented such a resistor. The alternating current source may be a 200-cycle, 10-volt source.

If now the switch 16 be closed in such a direction that the alternating current fluxes produced in the inductors at 11 and 12 are in phase or in the same direction at the same instant and there are unidirectional fluxes threading the inductors in the same axial direction, a direct current component will flow in the alternating current circuit described, proportional to the average unidirectional flux strength at the two inductors which current will be indicated on the direct current instrument 17. The reason for this is that the unidirectional fluxes more or less saturate the narrow parts of the inductors and make the alternating current reactance of the coils 13 and 14 less when the alternating current is in such a direction as to increase such saturation than when the alternating current fluxes oppose the unidirectional fluxes. Hence, more current flows in one direction than in the other, and the difference results in a direct current component, which is further emphasized by the nonlinear resistor at 18 which has the characteristic of decreasing resistance with increase in voltage across it. Thus, if a unidirectional flux is present threading the inductors in the direction of their axes and in the same direction, a large reading will be obtained on the instrument 17 and such reading is a measurement of the average unidirectional field at the two points.

If now switch 16 be reversed so that the alternating current excitation of the two inductors is 180 degrees out of phase, the direct current component will become zero if the unidirectional fluxes in the two inductors are equal. However, if unequal, a direct current component will flow which is proportional to the difference in the unidirectional field strength in the two inductors, and instrument 17 will produce a corresponding reading. While the reading of instrument 17 under these circumstances is proportional to the flux gradient between the two points at which the inductors are located, the sensitivity obtained is that corresponding to $\phi_1 - \phi_2 = \phi_x$ where $\phi_1$ and $\phi_2$ represent the total unidirectional flux strength at the two inductors 11 and 12, and $\phi_x$ the difference. $\phi_x$ may be a small percentage of $\phi$, so that the sensitivity is correspondingly low. It is therefore preferable to provide a winding 19 about both inductors 12 and 13 and, producing equal fluxes in each, to neutralize the average unidirectional flux therein. Coil 19 is connected to a direct current source of supply 20 through an ammeter 21 and current adjusting resistor 22. The current in neutralizing coil 19 is caused to flow in a direction to buck the flux under investigation.

Now with the alternating current coils excited in phase, the current in the neutralizing coil is adjusted until meter 17 reads zero. If now the $\phi_1$ and $\phi_2$ fluxes are equal, there will be no unidirectional flux in the inductors; if unequal, the flux in inductor 13 instead of being $\phi_1$ will be $$\phi_1 - \frac{\phi_1+\phi_2}{2}$$

and that in inductor 14 will be $$\phi_2 - \frac{\phi_1+\phi_2}{2}$$

These residual fluxes will be in reverse directions in the inductors. Now when switch 16 is reversed to connect coils 13 and 14 out of phase, a direct current instrument reading will be produced which is proportional to $\phi_1-\phi_2$, but it will be produced by the sum of the residual fluxes instead of the difference in the large fluxes $\phi_1$ and $\phi_2$. The dimensions of the inductors are made such as to be sensitive to the desired saturation influences by such residual fluxes, and hence, high sensitivity with respect to small flux gradients in the flux under investigation is obtained.

The coil 19 may also be used to remove residual hysteresis magnetism from the inductors in the well-known manner of connecting the same to the alternating current source and gradually reducing the current to zero. However, this has been found to be unnecessary with a sensitiveness that gives full scale deflection of meter 17 for a gradient of ten milligauss per foot, with the two inductors separated by ten feet.

I prefer to provide a calibrating coil 23 about one of the inductors and connected to the direct current source 20 through an instrument 24 and rheostat 25. By means of coil 23 a known gradient can be produced at any time for calibrating instrument 17 and for checking the calibration at any time.

While the apparatus described is particularly designed for measuring flux gradients, it is also useful for measuring average flux density. For example, the instrument 21 may be calibrated in terms of average flux density and read at the time the average flux density is neutralized. From such reading and the flux gradient measurement the flux density at either inductor may be obtained. Likewise the inductors may be used individually to measure flux densities.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Apparatus responsive to unidirectional flux gradients comprising a pair of magnetic inductors of high permeability material and of such minimum cross section as to become saturated by low values of flux, said inductors being supported with their magnetic axes in line a predetermined distance apart, alternating current magnetizing coils wound about each inductor, a circuit including a device responsive to direct current and a reversing switch to one of the coils for connecting said coils in series relation to a source of alternating current, and a direct current coil wound about both inductors for neutralizing the average unidirectional flux in said inductors.

2. Apparatus for measuring unidirectional flux gradients comprising a tube of nonconducting, nonmagnetic material, a pair of magnetic inductors supported in said tube at least one foot apart in the axial direction of the tube, said inductors being of high permeability magnetic material having a minimum cross section capable of being saturated by low values of flux and having their magnetic axes in alignment in the direction of the tube axis, alternating current exciting coils wound about each inductor, an alternating current circuit including a sensitive direct current instrument and a nonlinear resistor for energizing said coils in series relation, a reversing switch in the circuit whereby the phase relation of the alternating currents in the two coils may be reversed, a winding on said tube about both inductors, and a direct current circuit including a rheostat for adjustably energizing said winding for the purpose of neutralizing the average unidirectional flux in said inductors.

3. Apparatus for measuring unidirectional flux gradients comprising a pair of inductor elements, said elements being of dumbbell shape and made of a high permeability material and having a minimum cross section capable of being saturated by low values of flux, means for supporting said inductors in fixed spaced relation with their flux axes oriented so as to be threaded by the flux under investigation but at different values of such flux if there is a flux gradient between such inductors, coils wound about the inductors, an alternating current source of supply, a circuit including a sensitive direct current measuring instrument and a nonlinear resistance for connecting said coils in series to said source of supply, winding means about both coils, a direct current circuit for energizing said winding means to produce equal fluxes in both inductors, and means for adjusting the value of such energization for the purpose of neutralizing the average of the unidirectional flux in both inductors.

4. Apparatus for measuring unidirectional flux gradients comprising a pair of saturable core inductors supported in fixed spaced relation with their flux axes parallel, a coil about each inductor, a circuit for supplying both of such coils with alternating current in series, said circuit containing a sensitive instrument for measuring any direct current component in the circuit and a nonlinear resistance for emphasizing any such direct current component, means for reversing the circuit connection to one of said coils, winding means energized by direct current and producing equal fluxes in both inductors for neutralizing the average unidirectional flux under investigation which threads said inductors, a direct current coil about one inductor only, and a direct current circuit containing a measuring instrument and current adjusting means for energizing said last mentioned coil for calibrating the apparatus.

ALBERT W. HULL.